Figure 1:
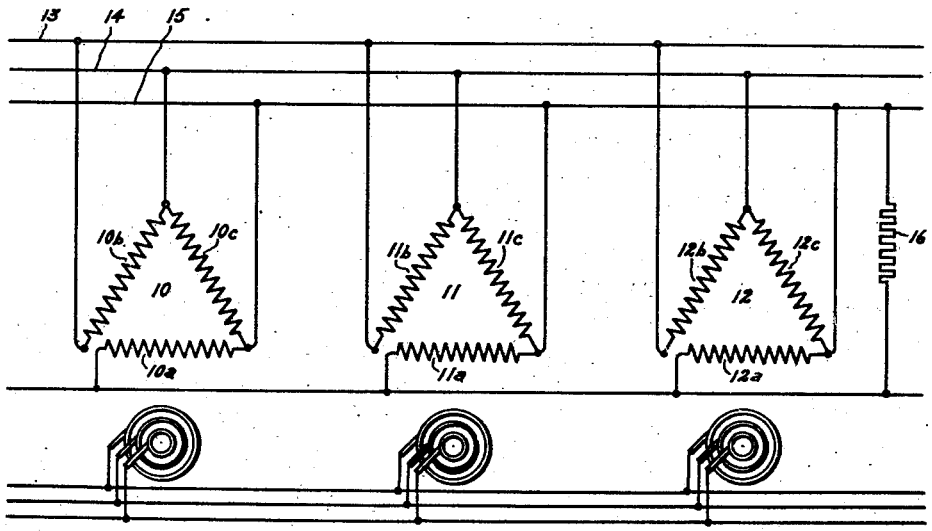

Jan. 31, 1933.  H. STEIN  1,895,946
CONTROL SYSTEM
Filed Jan. 30, 1931   2 Sheets-Sheet 1

Inventor:
Herbert Stein,
by Charles V. Tulla
His Attorney.

Jan. 31, 1933.    H. STEIN    1,895,946
CONTROL SYSTEM
Filed Jan. 30, 1931    2 Sheets-Sheet 2

Inventor:
Herbert Stein,
by Charles A. Mullen
His Attorney.

Patented Jan. 31, 1933

1,895,946

UNITED STATES PATENT OFFICE

HERBERT STEIN, OF BERLIN, GERMANY, ASSIGNOR TO GENERAL ELECTRIC COMPANY, A CORPORATION OF NEW YORK

CONTROL SYSTEM

Application filed January 30, 1931, Serial No. 512,424, and in Germany February 4, 1930.

This invention relates to control systems, more particularly to systems for controlling the operation of plural motor drives for carding sets and the like; and it has for an object the provision of a simple, reliable and efficient system of the kind for effecting a uniform braking of the individual drive motors so that the several sections of the drive are uniformly decelerated from their normal operating speed to rest.

In order to obtain lap-form feeding without the usual disturbances in carding sets and the like, approximate synchronism of the individual drive motors is required. In this case it is not absolutely necessary that the motors operate in absolute synchronism since if the speeds of the individual motors differ slightly from each other within moderate limits, only a constant delay in the lap-form feeding occurs without any difficulties arising.

Under the usual conditions of operation the motors have approximate synchronism in the case of moderate load fluctuations occurring during normal operation, since the motors operate with a very small slip when all the starting resistance has been cut out and the rotor windings have been short circuited.

Difficulties during the deceleration and stopping of the individual motors of the drive have arisen, however, due to the unequal centrifugal moments of the individual motors and the sections of the machine driven thereby, and as a result of these unequal moments the individual motors as well as the sections of the machine which are respectively driven thereby do not decelerate uniformly. Moreover, it is desirable to apply braking to the motors during deceleration in order to obtain the shortest possible periods of deceleration and stopping of the individual drive motors.

The present invention renders possible a uniform deceleration of all the motors of the drive and at the same time a very rapid braking of the asynchronous motors, which are electrically coupled with each other both on the stator and rotor side, is produced by disconnecting a single stator phase of each of the motors from the network and short circuiting all of these disconnected stator phases through a common resistance. This common resistance serves to dissipate the stored energy quite rapidly and as a result a uniform braking effect is applied to all of the motors.

The parallel connections between the windings of the rotors cause the motors to decelerate uniformly, i. e., operate in synchronism during the decelerating operation, due to the large synchronizing torques produced thereby and which increase with decreasing speed of motors. It is only when the drive has been brought completely to rest that all of the phases of the stator windings of the individual motors are disconnected from the network.

Figure 2:
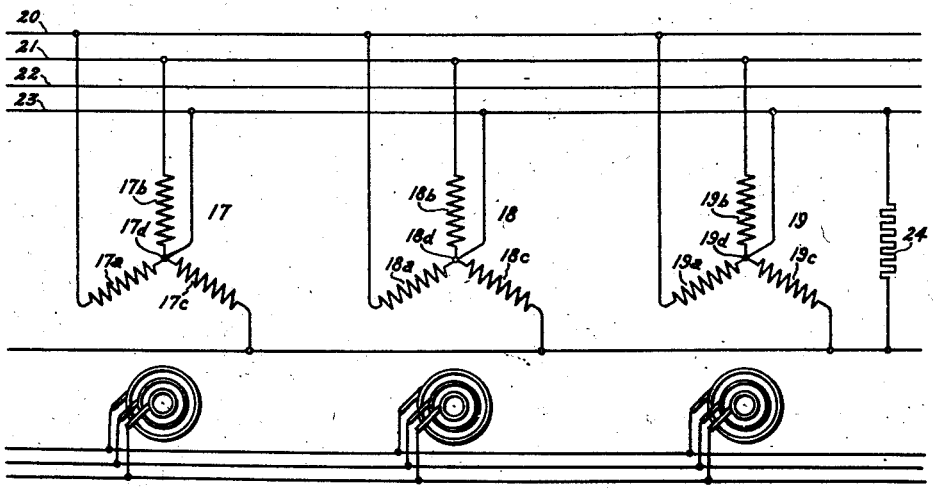
Figure 3:
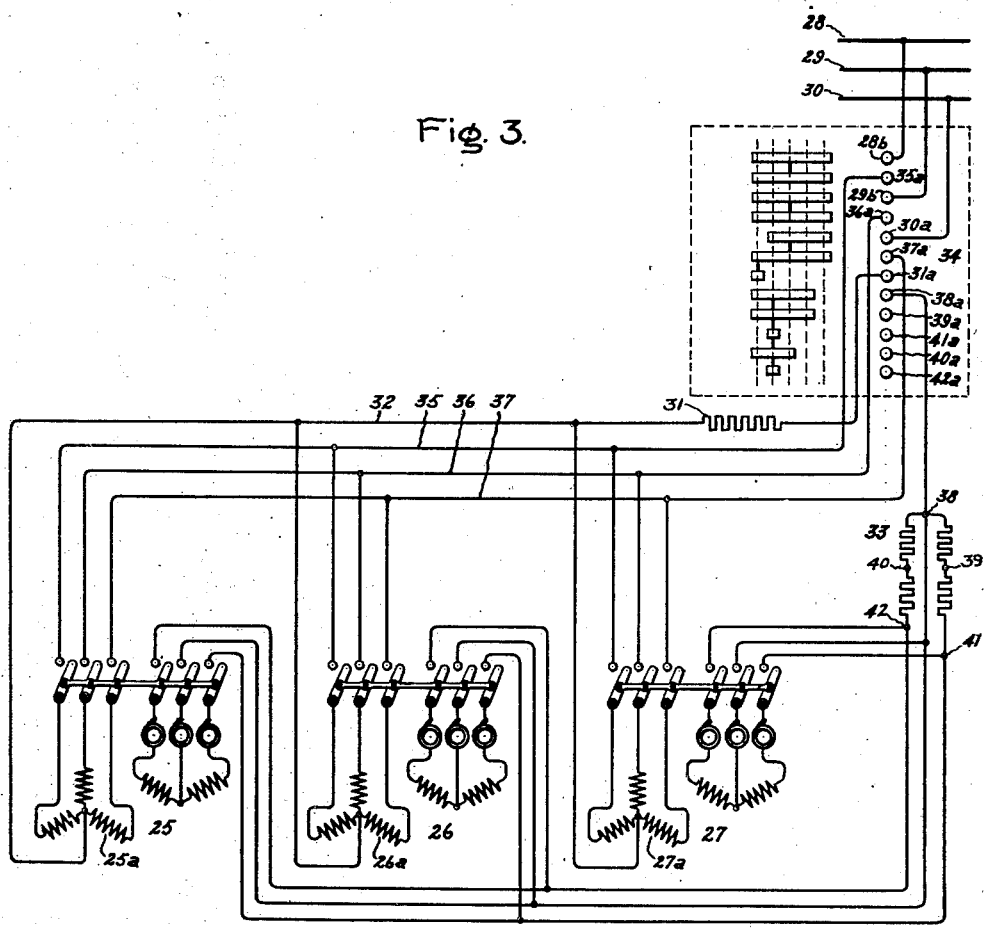

For a better and more complete understanding of the invention, reference should now be had to the following specification and to the accompanying drawings in which Figs. 1 and 2 are simple diagrammatical representations of the stator circuit that are established for the decelerating and braking of delta and star wound motors respectively; and Fig. 3 is a simple diagrammatical illustration of a controller for effecting the necessary connections.

Referring now to Fig. 1 of the drawings, the stator windings of a plurality of delta wound alternating current motors 10, 11 and 12 are supplied with alternating current from any suitable source such for example as that represented in the drawings by the three supply lines 13, 14 and 15. As shown in the drawings the primary winding of the motor 10 comprises the three-phase winding $10_a$, $10_b$ and $10_c$; the primary winding of the motor 11 comprises three phase windings $11_a$, $11_b$ and $11_c$ and the primary winding of the motor 12 comprises the three phase windings $12_a$, $12_b$ and $12_c$ respectively. During the decelerating and braking operation of these motors a single phase winding of each of the motors is disconnected from the source and all of these disconnected phases are short circuited through the common single phase resistor 16. As shown in the drawings one terminal of each of the single phase windings $10_a$, $11_a$ and $12_a$ of the primary windings of the motors 10, 11 and 12 is disconnected from the line 13 and connections are established between these disconnected terminals and a terminal of the resistor 16 so that these three single phase windings are all short circuited by the resistor 16.

In Fig. 2 the primary windings of the motors 17, 18 and 19 are shown as being star-connected and as being supplied from any suitable source of alternating current supply such for example as that represented in the drawings by the three supply lines 20, 21 and 22. The primary winding of the motor 17 comprises the three phase windings $17_a$, $17_b$ and $17_c$; that of the motor 18 comprises the three windings $18_a$, $18_b$ and $18_c$; while that of the motor 19 comprises the three windings $19_a$, $19_b$ and $19_c$ respectively. The conductor 23 serves to interconnect the three neutral points $17_d$, $18_d$ and $19_d$ of the primary windings of the several motors so that the primary windings of the several motors have a common neutral. During the braking and decelerating operation of the several motors the line terminals of a single phase of each of the primary windings is disconnected from the source, e. g., as shown in the drawings the line terminals for the single phase windings $17_c$, $18_c$ and $19_c$ are disconnected from the line 22 and these three single phase windings are short circuited upon the common single phase resistor 24 as shown in the drawings.

It will thus be observed that in both cases, i. e., delta and star connected primaries, a single phase of each of the primary windings is disconnected from the network and is short circuited through a common resistor. In the case of star connected motors resistance is also inserted in a common rotor circuit of all of the motors in order to provide a better braking effect.

In Fig. 3 of the drawings the individual motors 25, 26 and 27 are shown as being provided with three phase star connected primary windings and two phase V-connected secondary windings; the primary windings being supplied from any suitable source of power such for example as that represented in the drawings by the supply lines 28, 29 and 30. The neutral points of the stator winding are connected to the common resistance 31 by means of the common neutral wire 32. A common starting resistance 33 shown in the drawings as a two phase starting resistance in conformity with the two phase rotor windings of the individual motors is connected in the rotor circuit of the motors as shown. A suitable multi-point master controller 34, is shown in the drawings as of the drum controller type; it being provided with stationary fingers and cooperating segments for establishing the necessary starting, running and braking connections.

With the above understanding of the elements comprising an embodiment of the invention, the operation will readily be understood from the detailed description which follows. Assuming now that the motors are to be started, the controller 34 is operated into its first operative position. The terminals of the motors 25, 26 and 27 are connected to the supply source 28, 29 and 30 through the conductors 35, 36 and 37, the fingers $35_a$, $36_a$ and $37_a$, and the fingers $28_b$, $29_b$ and $30_a$ by means of the cooperating segments on the controller. It will be observed that in the first position of the controller all of the starting resistance 33 is in circuit with the secondary windings of the motors. In the second position of the master controller the point 38 of the starting resistance is connected through the contact fingers $38_a$ and $39_a$ with the point 39 so that a section 38—39 of the starting resistance is short circuited.

In the third position of the master controller an additional section of the starting resistance is short circuited due to the short circuiting of the points 40 and 38 by means of the contact fingers $40_a$ and $38_a$ and the cooperating segment on the master controller. In the fourth position of the master controller all of the starting resistance is short circuited due to the connection of the points 41 and 42 with the point 38 through the fingers $41_a$, $42_a$ and $38_a$ and the cooperating segments in the master controller. The drive has thus been accelerated to its normal operating speed.

Now if the drive is to be decelerated and stopped, the master controller is operated to its fifth position. It will be observed that in this position of the master controller the conductor 37 is disconnected from the phase 30 of the supply source so that if a single phase of the primary windings of each of the motors 25, 26 and 27 is disconnected from the supply, as shown in the drawings, the disconnected phases are $25_a$, $26_a$ and $27_a$ respectively. The line terminals of these disconnected phases are connected through the fingers $31_a$, $37_a$ and the cooperating segment of the master controller with one terminal of the single phase resistance 31, the opposite terminal of which is connected by means of the conductor 32 to the neutral point of each of the primary windings of the respective motors. It will also be observed that a portion of the starting resistance is reinserted in the secondary windings of the motors due to the open circuiting of the contact fingers $41_a$, $42_a$ by the cooperating segment of the master controller. In the fifth position, therefore, the stator windings of the motors are connected as shown in Fig. 2 so that the entire drive is rapidly and uniformly braked to rest.

The master controller 34 is designed in such a manner that after it has been moved into the fifth position to establish the braking connections just described, it may be moved directly in the same direction of rotation to the neutral position. This arrangement has the following purpose: If as in the well-known arrangements the braking position of the master controller were arranged ahead of the running position 1–3, difficulties would arise during the starting operation upon operation of the master controller beyond the braking position. These difficulties arise when for any reason, such for example as owing to the premature operation of the master controller from the braking to the neutral position, the motors have not decelerated uniformly so that on stopping the individual rotors of the various motors would all be out of step with each other. Consequently upon operating the master controller through the braking position if ahead of the starting position and in which only one phase of each of the motors is connected to the system, hunting of the motors would arise. By arranging the braking step between the last operating position of the master controller and the neutral position it is unnecessary to operate the controller through the braking step upon starting the motors so that the above-mentioned difficulty is avoided.

What I claim as new and desire to secure by Letters Patent of the United States, is,—

1. A sectional drive for carding sets and the like comprising a plurality of asynchronous alternating current motors, a resistance device, and means for disconnecting one stator phase of each of said motors from the source and connecting said disconnecting stator phases to said resistance device so that all of said motors are uniformly braked to rest.

2. A sectional drive for carding sets and the like comprising a plurality of asynchronous alternating current motors of the wound rotor type, connections between the stator windings of said motors and a source of power, means comprising electrical connections between the rotor windings of said motors for providing substantially synchronous operation of said motors when running at normal speed, a resistance, and means comprising a switching device for interrupting the connections between one stator phase of each of said motors and the source and short circuiting said disconnected stator phases on said resistance while leaving the remainder of said connections unchanged so as to brake all of said motors to rest uniformly.

3. A sectional drive for carding sets and the like comprising a plurality of alternating current motors of the wound rotor type having star connected primary windings, connections between said primary windings and a source of power, additional connections between the rotor windings of said motors to provide for substantially synchronous running operation of said motors, a single phase primary resistance, a secondary resistance device, and means comprising a switching device for interrupting the connections between the terminals of one phase of the stator windings of each of said motors and said source and connecting said primary resistance between the neutral point of said primary windings and said terminals and for inserting said secondary resistance in said additional connections so as to brake all of said motors uniformly to rest.

4. A sectional motor drive for carding sets and the like comprising a plurality of wound rotor induction motors, connections between the primary windings of said motors and a source of power, additional connections between the secondary windings of all of said motors, a single phase primary resistance, and means comprising a master controller having a neutral position and a plurality of operating positions, said controller being operable from said neutral position to one of said operative positions to establish said connections, operable in the same direction to a second operative position to interrupt the connections between the terminals of one phase of the primary windings of all of said motors and the source and connecting said primary resistance in circuit with said disconnected primary phases, and operable in the same direction to said neutral position.

In witness whereof, I have hereunto set my hand this 12th day of January, 1931.

HERBERT STEIN.